(12) United States Patent
Richer et al.

(10) Patent No.: US 10,694,662 B2
(45) Date of Patent: Jun. 30, 2020

(54) LONGITUDINAL LEAF STRIPPER AND CORRESPONDING BEET HARVESTING MACHINE

(71) Applicant: EXEL INDUSTRIES, Epernay (FR)

(72) Inventors: Eduard Richer, Hagelstadt/Gailsbach (DE); Florian Gallmeier, Schierling (DE)

(73) Assignee: EXEL INDUSTRIES, Epernay (FR)

( * ) Notice: Subject to any disclaimer, the term of this patent is extended or adjusted under 35 U.S.C. 154(b) by 136 days.

(21) Appl. No.: 15/773,963

(22) PCT Filed: Nov. 3, 2016

(86) PCT No.: PCT/EP2016/076522
§ 371 (c)(1),
(2) Date: May 4, 2018

(87) PCT Pub. No.: WO2017/076953
PCT Pub. Date: May 11, 2017

(65) Prior Publication Data
US 2018/0317382 A1    Nov. 8, 2018

(30) Foreign Application Priority Data

Nov. 6, 2015 (DE) .................... 20 2015 105 938 U

(51) Int. Cl.
*A01D 23/02*       (2006.01)
(52) U.S. Cl.
CPC ........ *A01D 23/02* (2013.01); *A01D 2023/022* (2013.01); *A01D 2023/026* (2013.01)

(58) Field of Classification Search
CPC .............. A01D 23/02; A01D 2023/022; A01D 2023/026; A01D 2023/028; A01D 33/06;
(Continued)

(56) References Cited

U.S. PATENT DOCUMENTS

| | | | |
|---|---|---|---|
| 1,273,756 A | * | 7/1918 | Fanger ................... A01D 23/04 171/32 |
| 1,476,945 A | * | 12/1923 | Beale ..................... A01D 23/04 171/34 |

(Continued)

FOREIGN PATENT DOCUMENTS

| | | | |
|---|---|---|---|
| DE | 2618063 A1 | * 11/1977 | ............ A01D 33/06 |
| DE | 2716015 C2 | 2/1982 | |

(Continued)

*Primary Examiner* — Arpad Fabian-Kovacs
(74) *Attorney, Agent, or Firm* — Thompson Coburn LLP; Steven M. Ritchey

(57) ABSTRACT

The beet head trimming apparatus for a beet-harvesting machine comprises a frame, two flail hubs rotatable about an axis, flails, which are designed in order to remove leaves from beets remaining in the ground, and a drive in order to drive the flail hubs with respect to the frame. The drive comprises a motor and a gearbox and the flails are movably attached to the flail hubs. The motor and the gearbox are attached to the frame. The frame of the beet head trimming apparatus is coupled with a beet-harvesting machine. The beet head trimming apparatus couples the motor with an electrical and/or hydraulic energy source. The beet head trimming apparatus is a module that can be handled separately from the beet-harvesting machine.

17 Claims, 4 Drawing Sheets

Figure 1:
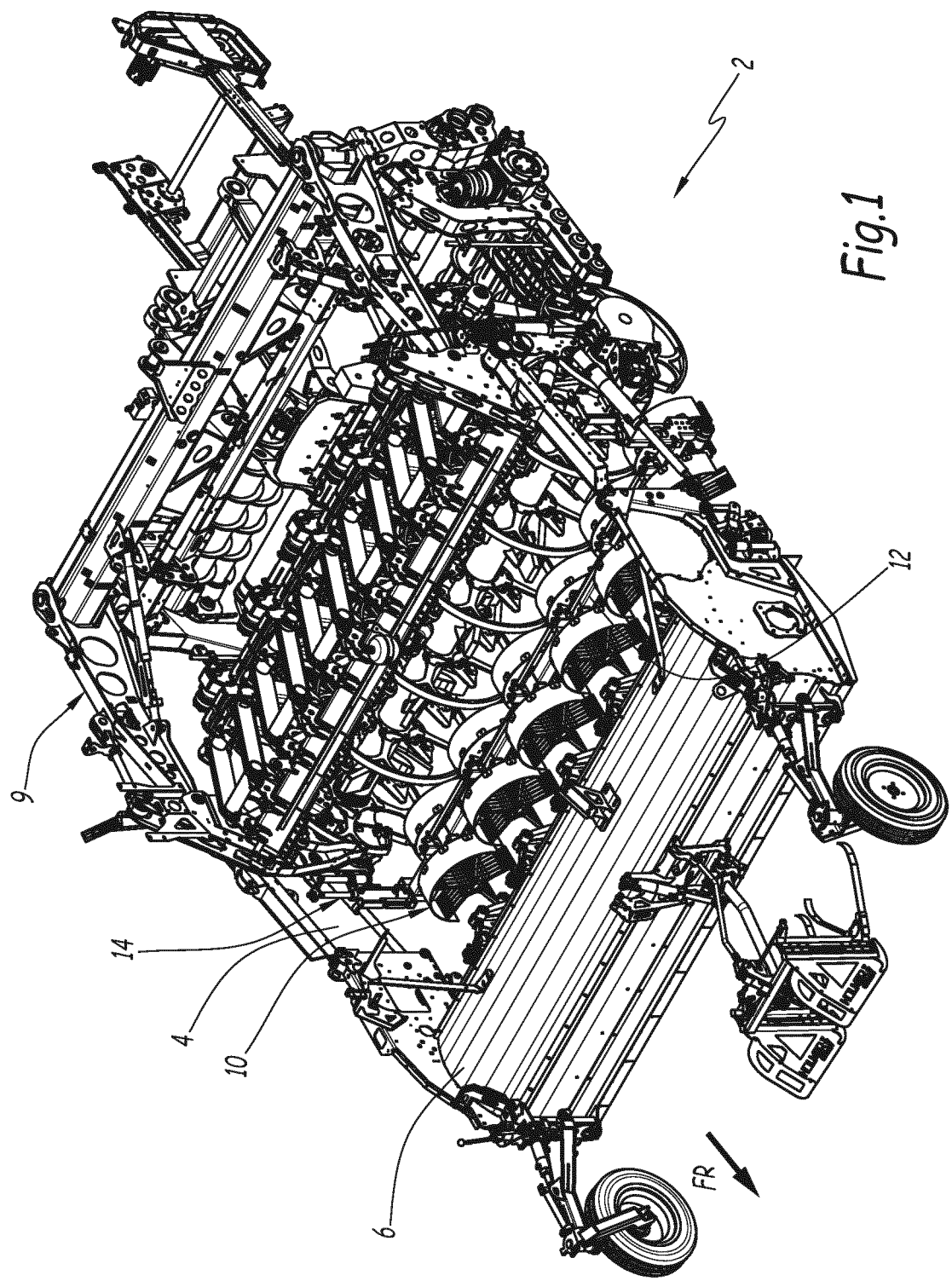

(58) Field of Classification Search
CPC ...... A01D 23/06; A01D 23/04; A01D 33/105;
A01G 18/70
See application file for complete search history.

(56) References Cited

U.S. PATENT DOCUMENTS

| | | | | | |
|---|---|---|---|---|---|
| 2,505,089 | A | * | 4/1950 | Bailey | A01D 33/06 56/15.9 |
| 2,608,816 | A | * | 9/1952 | Lembke | A01D 23/02 56/229 |
| 3,168,145 | A | * | 2/1965 | Gunkel | A01D 45/22 171/61 |
| 3,527,038 | A | * | 9/1970 | Wood | A01D 34/535 56/294 |
| 3,583,136 | A | * | 6/1971 | Eisenhardt | A01D 23/02 56/121.43 |
| 3,871,161 | A | * | 3/1975 | Eisenhardt | A01D 23/02 56/121.46 |
| 4,236,581 | A | * | 12/1980 | Beckett | A01D 25/048 111/186 |
| 4,291,524 | A | * | 9/1981 | Gates | A01D 33/06 56/121.43 |
| 4,301,646 | A | * | 11/1981 | Gates | A01D 23/02 56/121.43 |
| 4,308,714 | A | * | 1/1982 | Gates | A01D 33/06 56/121.43 |
| 4,691,506 | A | * | 9/1987 | Schwitters | A01D 23/02 56/12.7 |
| 4,920,737 | A | * | 5/1990 | Wieneke | A01D 23/06 56/249 |
| 5,035,109 | A | * | 7/1991 | van den Top | A01G 18/70 56/327.1 |
| 5,107,664 | A | * | 4/1992 | Ross | A01D 23/02 171/17 |
| 5,660,034 | A | * | 8/1997 | Gates | A01B 73/042 56/121.4 |
| 5,799,474 | A | * | 9/1998 | Ingram | A01D 89/003 56/119 |
| 8,099,936 | B2 | * | 1/2012 | Bryant | A01D 34/435 241/194 |
| 8,943,788 | B2 | * | 2/2015 | Miller | A01D 33/14 171/139 |
| 2008/0148702 | A1 | * | 6/2008 | Peterson | A01D 23/02 56/121.4 |
| 2009/0071116 | A1 | * | 3/2009 | Barnett | A01D 34/668 56/153 |
| 2012/0031064 | A1 | * | 2/2012 | Barnett | A01D 34/668 56/157 |
| 2014/0196430 | A1 | * | 7/2014 | Windhausen | A01D 34/8355 56/502 |
| 2017/0105337 | A1 | * | 4/2017 | Ramsauer | A01D 27/00 |

FOREIGN PATENT DOCUMENTS

| | | | |
|---|---|---|---|
| DE | 3213563 A1 | 10/1983 | |
| DE | 3230182 A1 * | 2/1984 | ........... A01D 25/005 |
| DE | 3424077 A1 * | 1/1985 | ............. A01D 23/02 |
| DE | 3338043 A1 * | 5/1985 | ............. A01D 17/06 |
| EP | 430779 A1 * | 10/1978 | ............. A01D 23/02 |
| EP | 0016712 A1 * | 10/1980 | ............. A01D 23/06 |
| FR | 1587299 A | 3/1970 | |
| FR | 2928241 A1 | 9/2009 | |
| GB | 875861 A | 8/1961 | |
| GB | 2100108 A * | 12/1982 | ............. A01D 23/02 |
| NL | 7404122 A * | 10/1974 | ............. A01D 33/06 |

* cited by examiner

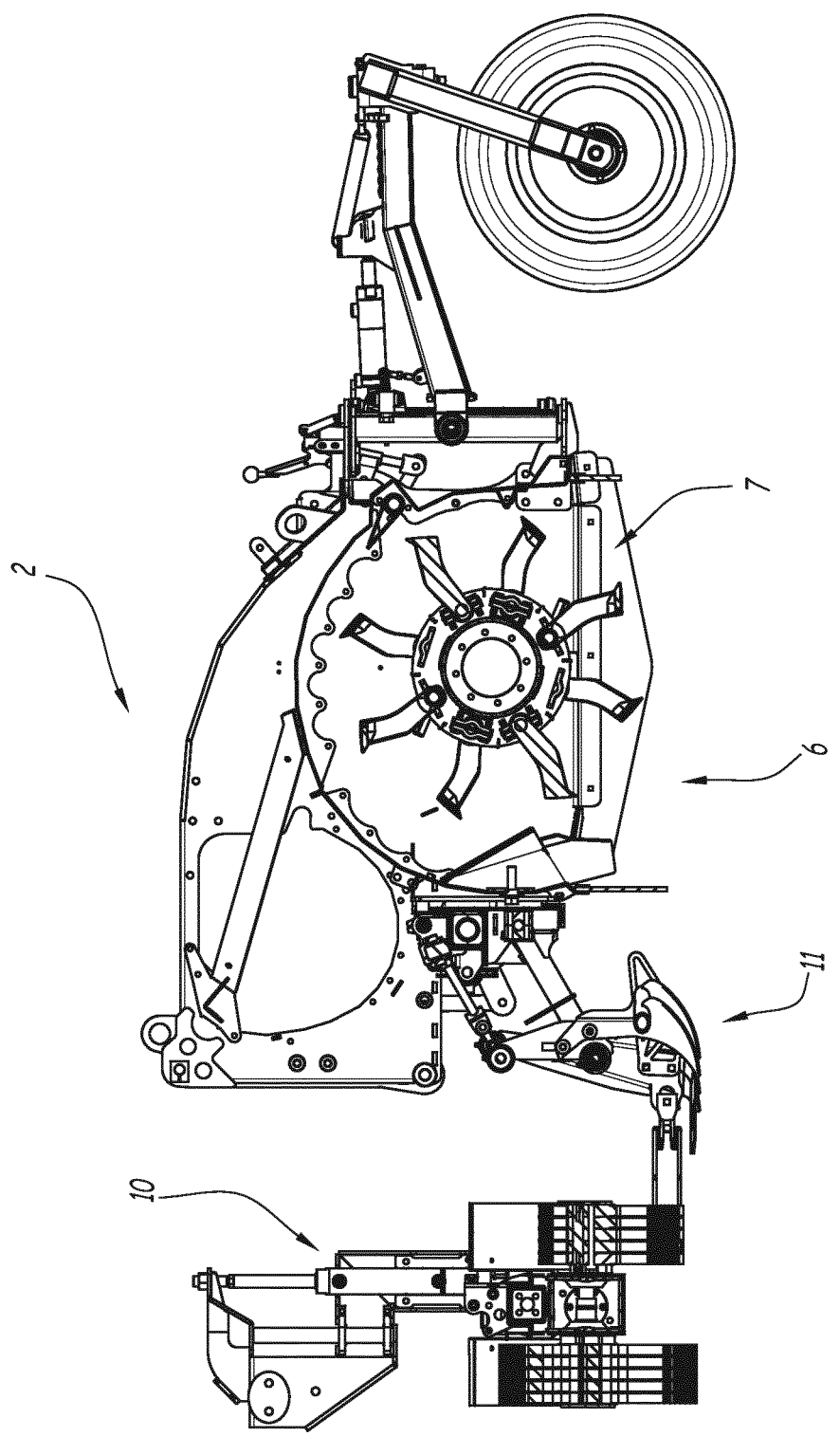

LONGITUDINAL LEAF STRIPPER AND CORRESPONDING BEET HARVESTING MACHINE

CROSS-REFERENCE TO RELATED APPLICATIONS

This application is a U.S. National Phase application of PCT/EP2016/076522, filed on Nov. 3, 2016, claiming the benefit of German Application No. 202015105938.8, filed on Nov. 6, 2015, each of which is incorporated herein by reference in its entirety.

The invention relates to a beet head trimming apparatus for beet-harvesting machines according to the preamble of Claim 1, as well as to a corresponding beet-harvesting machine.

Such a beet head trimming apparatus is already known from DE 27 16 015.

The beet head trimming apparatus, which is disclosed in this document, has a complex design and leads to frequent damages to the beet head.

The problem addressed by the invention is to indicate a beet head trimming apparatus, which is simply designed and simplifies the operation of a beet-harvesting machine.

Moreover, a further problem addressed by the invention is to reduce damages to the beet head.

According to the present invention this problem is solved by the features indicated in the characterizing part of Claim 1, in conjunction with the features of the preamble.

The invention assumes that the motor and the gearbox are attached to the frame, that the frame has mechanical coupling means for coupling the frame with a beet-harvesting machine, that the beet head trimming apparatus has electrical and/or hydraulic coupling means for coupling the motor with an electrical and/or hydraulic energy source, and that the beet head trimming apparatus is a module that can be handled separately for the beet-harvesting machine.

The features of Claim 2 permit a simple design of the beet head trimming apparatus.

The features of Claim 3 permit a compact axial construction as well as a simple design of the trimming apparatus.

The features of Claims 4 and 5 bring it about that the kinetic energy, which acts from the flail on the beet head, is relatively low.

The features of Claim 6 lead to the beet head being hardly damaged.

The features of Claims 7 to 10 permit a simple design of the apparatus or the beet-havesting machine.

The invention is described further by means of a preferred embodiment.

Figure 3:
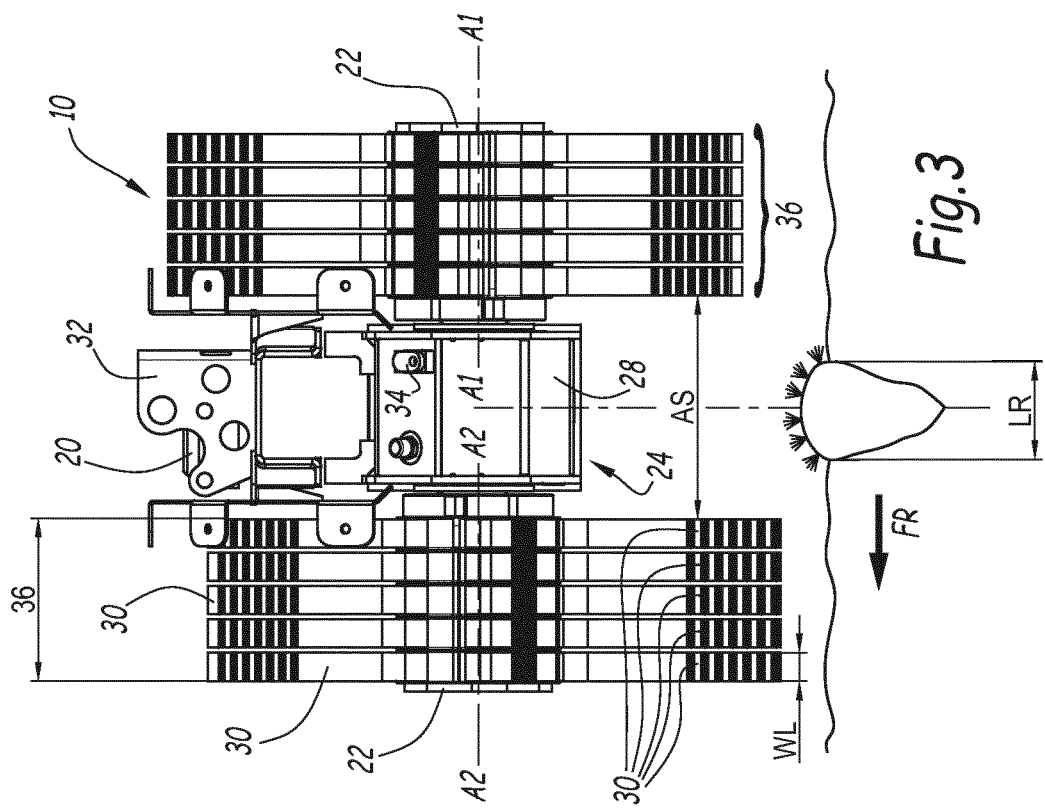
Figure 2:
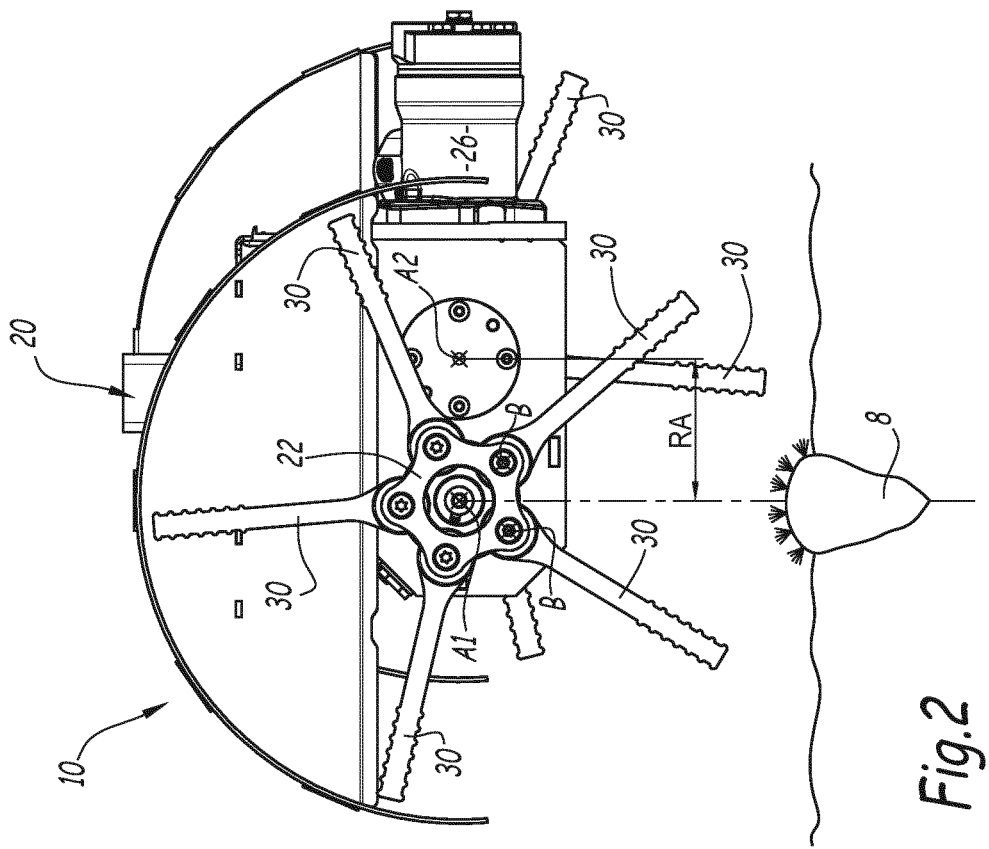
Figure 4:
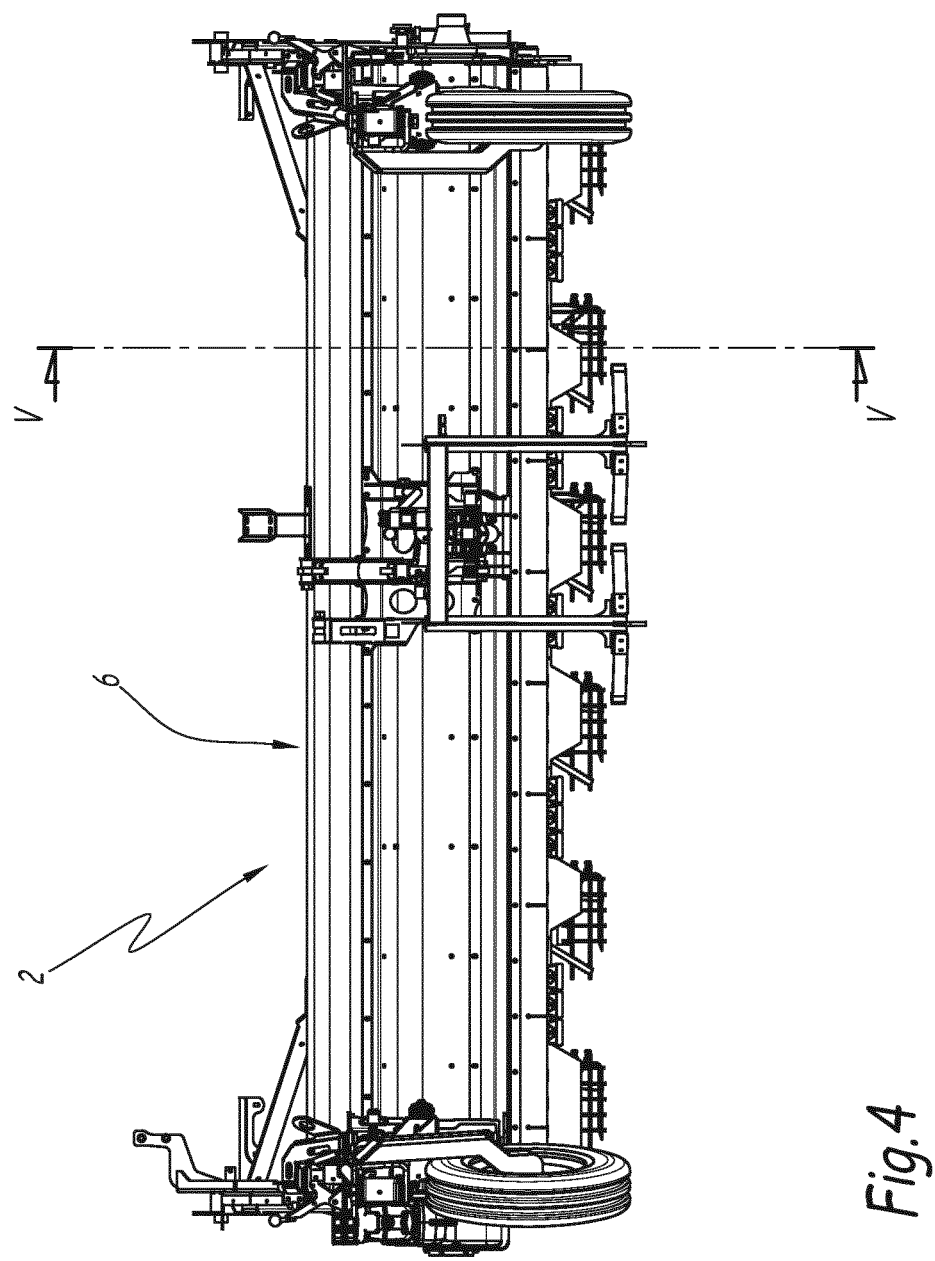

FIG. 1 shows a perspective view of a beet-harvesting machine according to the invention, FIG. 2 shows a front view of a beet head trimming apparatus of the beet-harvesting machine of FIG. 1, seen in the direction of travel, FIG. 3 shows a side view of the beet head trimming apparatus of FIG. 2, FIG. 4 shows a front view of the beet-harvesting machine of FIG. 1, and FIG. 5 shows a section through the beet-harvesting machine along the line V-V of FIG. 4.

The beet-harvesting machine 2 depicted on FIG. 1 comprises a frame 4 and an apparatus 6 for topping a beet 8 located in the ground.

The beet-harvesting machine can comprise further apparatuses, such as, for example, a clearing apparatus 9.

The beet-harvesting machine defines a direction of travel FR, in which the beet-harvesting machine 2 is moved during operation, in order to top the beets 8, to trim the beet heads and possibly to remove them from the ground. The expressions "vertical", "horizontal", "transverse" and "longitudinal" and "high" are used below in the standard operating position of the beet-harvesting machine 2, which it assumes during the harvesting of the beets.

The apparatus 6 for topping the beets 8 located in the ground comprises flail blades 7, as well as optionally aftertopper blades 11, which are arranged in the direction of travel after the flail blades 7 but before the beet head trimming apparatuses 10.

The beet-harvesting machine 2 is designed to top the beets 8 of a plurality adjacently located rows of beets, that is, to cut off the leaves and to "trim", that is, to chop off the remaining leaves of the beet head. For this purpose, the beet-harvesting machine comprises at least two beet head trimming apparatuses 10, in the embodiment six beet head trimming apparatuses 10.

If aftertopper blades 11 are used a part of the foliage of the beet left by the flail blades 7 on the beet 8 is chopped off by said aftertopper blades.

Then the beets are removed from the ground and the remaining earth is cleared. This can be achieved by the beet-harvesting machine 2 or by a separate machine.

The beet-harvesting machine 2 has a carrier 12 as well as a height adjustment device 14. The carrier 12 is a cross-member, which extends with respect to the frame 4 transversely to the direction of travel FR. The height adjustment device 14 is designed to adjust the beet head trimming apparatuses 10 vertically in height in respect to the frame 4 and comprises a hydraulic or pneumatic cylinder 16 or another appropriate actuator.

One of the beet head trimming apparatuses 10 of the beet-harvesting machine is elucidated in detail by means of FIGS. 2 and 3. The other beet head trimming apparatuses are identical.

On FIG. 2, on the one hand, the soil can be seen, in which the topped beet 8 remains as well as, on the other hand, the beet head trimming apparatus 10.

The beet 8 has a beet head, which has a maximum axial length LR.

The beet head trimming apparatus 10 has a frame 20 as well as two flail hubs 22, wherein each flail hub 22 is rotatably attached to the frame 20 about an axis of rotation A1 or A2. The axes of rotation A1 and A2 are parallel to one another and have a radial horizontal distance RA. The two axes A1 and A2 are put in operation at the same working height.

The expression "axial" is used below with respect to axes A1 and A2.

The beet head trimming apparatus furthermore has a drive 24, which is designed to drive the flail hubs 22 with respect to the frame 20 rotatably about the axes A1, A2. The drive 24 comprises a motor 26 and a gearbox 28, which is attached to the frame. In other words, the motor 26 and the gearbox 28 are fixed on the frame. The flail hubs 22 are driven by the drive in opposite directions about the axes A1, A2, specifically so that the flails 30, if they are located in the lower halves of their path, converge towards one another. On FIG. 2, the flail hub 22 therefore rotates with the axis A1 counterclockwise and the flail hub 22 with the axis A2 clockwise.

The beet head trimming apparatus 10 has, among other things, a plurality of flails 30, which are designed to separate leaves or leaf bases from the beets 8 remaining in the ground. Each flail 30 is movably attached to one of the flail hubs 22. In the embodiment, each flail 30 is hinged about an axis of rotation B. The axis of rotation B is parallel to the respective axes of rotation A1, A2 of the associated flail hub 22. At least one of the flails 30 and preferably each of the flails 30 consists of plastic, in particular, of elastomer. The elastomer can preferably be rubber.

The flails 30 are preferably blunt flails, that is, they have no cut edge.

The frame 20 has mechanical coupling means 32 for coupling the frame 20 with a beet-harvesting machine. The mechanical coupling means 32 comprise, for example, a fastening plate or a fastening flange. By means of the fastening plate the beet head trimming apparatus is fastened to the carrier 12, preferably by means of screwing.

The fastening plate 32 can also have means for the defined setting of the frame 20 with respect to the carrier 12, for example, a locating pin or location holes, which engage in cooperating locating pins or location holes of the carrier 12.

The beet head trimming apparatus 10 also comprises electrical and/or hydraulic coupling means 34 for coupling the motor 26 with an electrical and/or hydraulic energy source. Electrical coupling means comprise, for example, electrical lines and corresponding plugs/sockets.

The beet head trimming apparatus 10 is a module that can be handled separately from the beet-harvesting machine 2. This means that the beet head trimming apparatus 10 can be removed from the carrier 12 specifically by releasing the coupling 32 of the frame with the beet-harvesting machine as well as by releasing the electrical and/or hydraulic coupling means 34 and that the beet head trimming apparatus 10 can be handled when the coupling means are released in one piece, for example, can be transported or can be stored.

Preferably, the gearbox 28 is a gearbox that has exclusively toothed or friction wheels in the force path from the motor 26 to each of the flail hubs 22.

In particular, the gearbox 28 is a gearbox without chain- or belt drive.

The two flail hubs 22 are spaced apart from one another axially. The gearbox 28 is attached axially between the flail hubs 22. As can be seen on FIG. 3, the gearbox 28 is positioned axially exclusively between the flail hubs 22, so that the gearbox 28 does not axially cover the flail hubs. The motor 26 is also attached axially between the flail hubs 22. The motor 26 is positioned axially exclusively between the flail hubs 22, so that the motor does not axially cover the flail hubs.

The motor 26 is a hydraulic motor or an electrical motor. Each of the beet head trimming apparatuses 10 has its own motor 26.

The flails 30, which are attached to one of the flail hubs 22, have an axial distance AS from the flails 30, which are attached to the other flail hub 22. In the case of a plurality of flails, which are fastened to a flail hub, the distance AS is the axial distance between the two flails 30, which in each case are are placed closest to the adjacent flail hub.

In particular, the distance AS is greater than 10 cm and less than 50 cm.

The flails 30 of one flail hub 22 form a plurality of flail groups 36. Each flail group 36 comprises at least 2 flails, in the embodiment 5 flails, which are attached axially behind one another on a flail hub 22. All flails 30 of a flail group 36 are hinged axially behind one another about the same axis B on the hub 22. The flails 30 have an effective axial length WL, which is less than the maximum axial length LR of a beet head, in particular, the effective axial length WL is less than half of the maximum axial length LR of a beet head. Preferably, the effective axial length WL of a flail is between 1 cm and 8 cm.

During operation the beet-harvesting machine 2 is moved in the direction of travel FR. Initially the leaves of the beets 8 are removed by the topping apparatus 6 or by the flail blades 7. If aftertopper blades 11 are used, an upper part of the leaf base of the beets 8 are cut off therefrom. Then the leftover leaf bases on the beets are successively removed by the flails 30 of the one flail hub 22, or the beet head parts located on the beet head by the aftertopper blade 11 and leaves removed from the beet. Subsequently, the beet 8 is treated by the flails 30 of the other hub 22.

The height adjustment device 14 permits setting the working height of the flails 30 with respect to the beets or for the topping device 6.

The aftertopper blades 11 are attached detachably to a frame of the apparatus 6 for the topping.

The invention claimed is:

1. A beet head trimming apparatus for use with a beet-harvesting machine, the beet head trimming apparatus comprising:
    an apparatus frame;
    at least two flail hubs, wherein each flail hub is attached rotatably about a respective axis of rotation to the apparatus frame;
    a plurality of flails configured to remove leaves or leaf bases from beets remaining in the ground or to remove leaf bases from topped beets remaining in the ground; and
    a drive configured to drive the flail hubs with respect to the apparatus frame, wherein the drive comprises a motor and a gearbox;
wherein:
    each flail is movably attached to one of the flail hubs;
    the motor and the gearbox are attached to the apparatus frame;
    the apparatus frame has mechanical coupling means for coupling the apparatus frame with the beet-harvesting machine;
    the beet head trimming apparatus has electrical or hydraulic coupling means for coupling the motor with an electrical or hydraulic energy source; and
    the beet head trimming apparatus is a module configured to be separable from the beet-harvesting machine.

2. The beet head trimming apparatus according to claim 1, characterized in that the beet head trimming apparatus has electrical and hydraulic coupling means for coupling the motor with an electrical and hydraulic energy source.

3. The beet head trimming apparatus according to claim 1, characterized in that the gearbox is a gearbox, that has exclusively toothed or friction wheels in the force path from the motor to each of the flail hubs.

4. The beet head trimming apparatus according to claim 1, characterized in that the gearbox is axially attached between the flail hubs.

5. The beet head trimming apparatus according to claim 4, characterized in that the motor is also axially attached between the flail hubs.

6. The beet head trimming apparatus according to claim 1, characterized in that at least two flails that are attached on a flail hub form a flail group and the flails of each flail group are arranged axially behind one another with respect to the flail hub axis.

7. The beet head trimming apparatus according to claim 6, characterized in that at least one of the flails of the flail group has an effective axial length that is less than the maximum axial length of the beet head.

8. The beet head trimming apparatus according to claim 7, characterized in that at least one of the flails of a flail group has an effective axial length that is less than half the maximum axial length of the beet head.

9. The beet head trimming apparatus according to claim 7, characterized in that the axial length of the at least one flail is between 1 cm and 8 cm.

10. The beet head trimming apparatus according to claim 1, characterized in that at least one of the flails or each flail consists of plastic or elastomer.

11. The beet head trimming apparatus according to claim 1, characterized in that the motor is a hydraulic motor or an electrical motor.

12. A beet-harvesting machine comprising a machine frame, and at least one apparatus configured for topping a beet located in the ground, and at least one beet head trimming apparatus according to claim 1.

13. The beet-harvesting machine according to claim 12 having at least two beet head trimming apparatuses, and further comprising a carrier to which the at least two beet head trimming apparatuses are attached.

14. The beet harvesting machine according to claim 13, wherein the beet head trimming apparatus further comprises a height adjustment device or the beet harvesting machine further comprises an actuator, wherein the height adjustment device or the actuator is capable of vertically adjusting the carrier with respect to the machine frame.

15. The beet-harvesting machine according to claim 13, wherein the apparatus for topping the beet located in the ground comprises flail blades.

16. The beet-harvesting machine according to claim 15, wherein the apparatus for topping the beet located in the ground further comprises aftertopper blades.

17. The beet head trimming apparatus according to claim 1, wherein each flail is movably attached to one of the flail hubs via a hinge.

* * * * *